April 10, 1951 G. H. PEMBROKE 2,548,119
STENCIL PRINTING MACHINE
Filed May 20, 1947 12 Sheets-Sheet 8
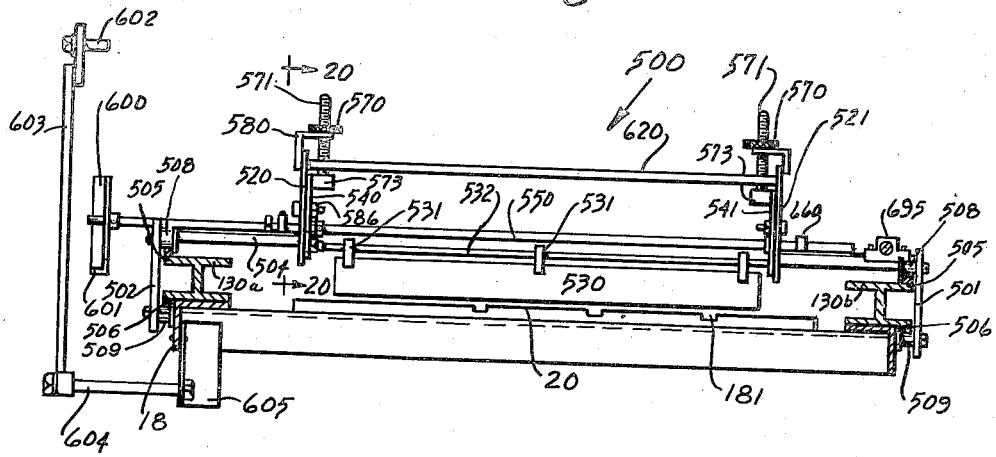
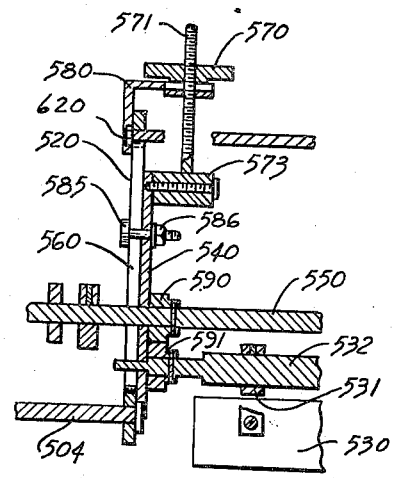
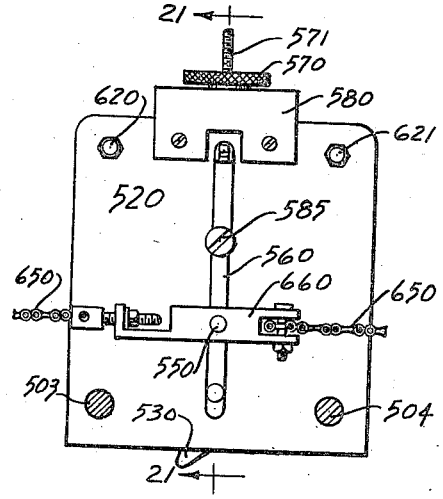
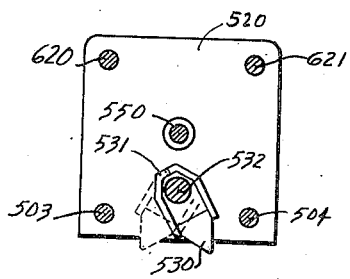
INVENTOR.
GEORGE H. PEMBROKE
BY Ostrolenk and Faber
ATTORNEYS

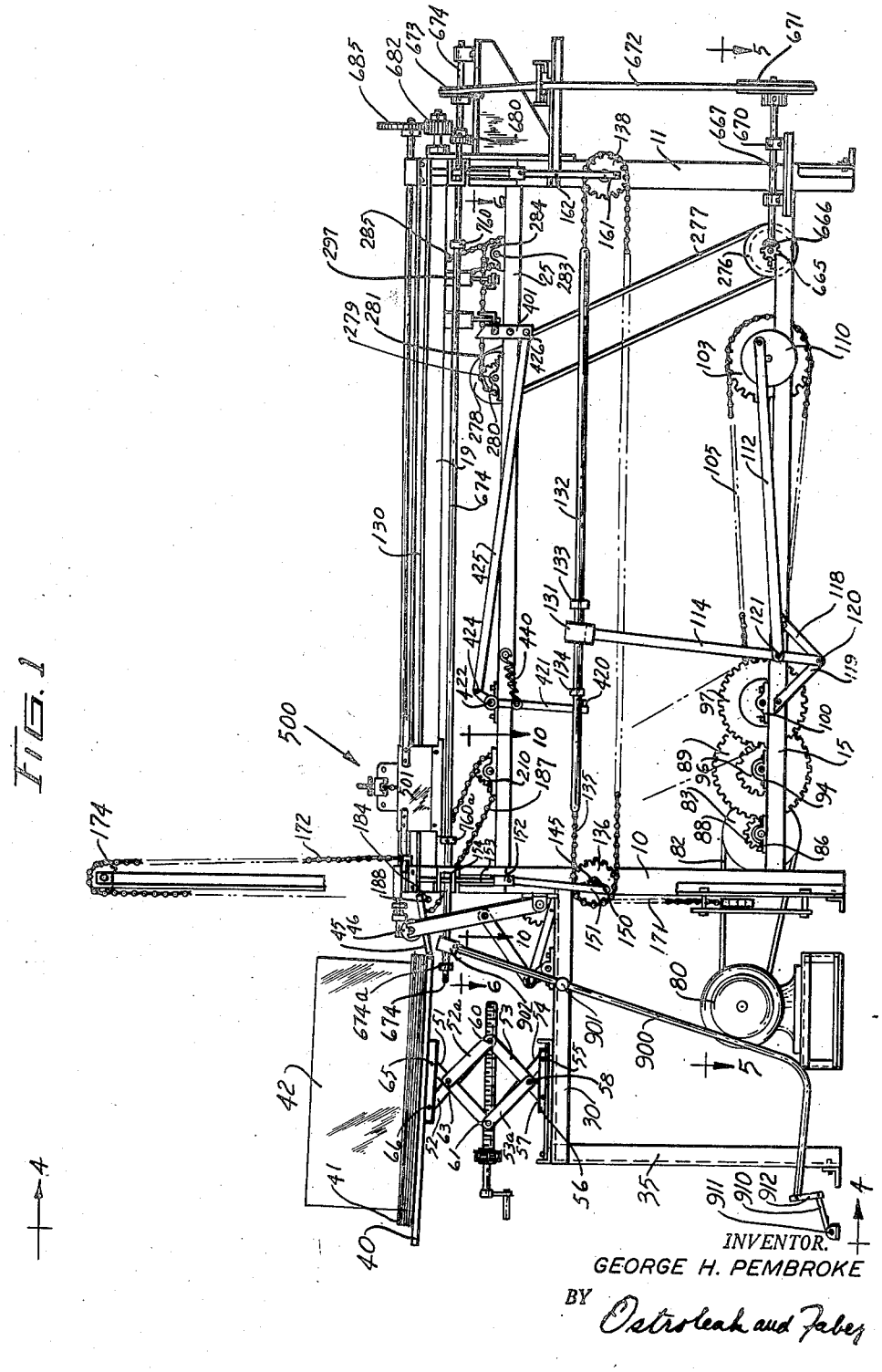

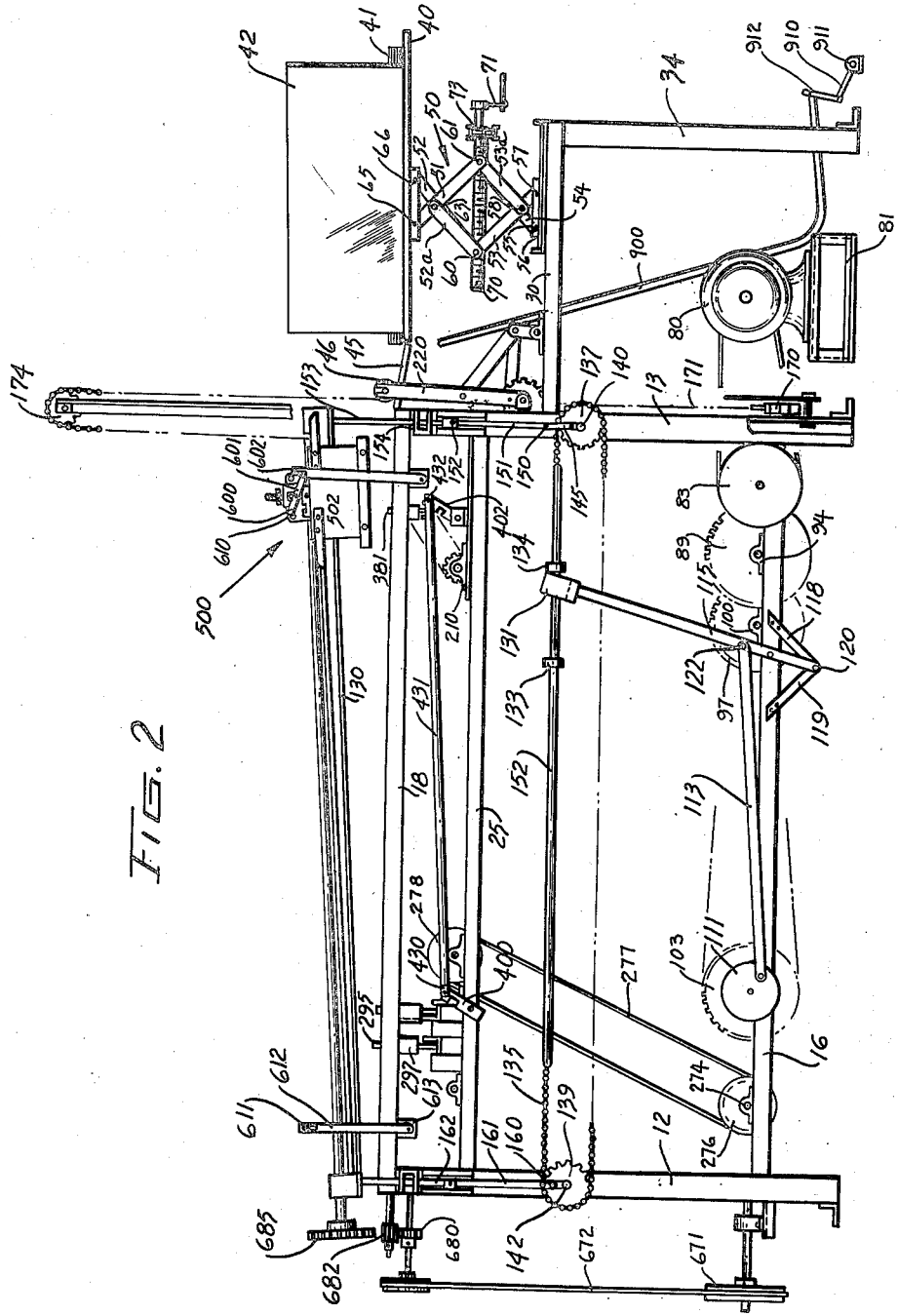

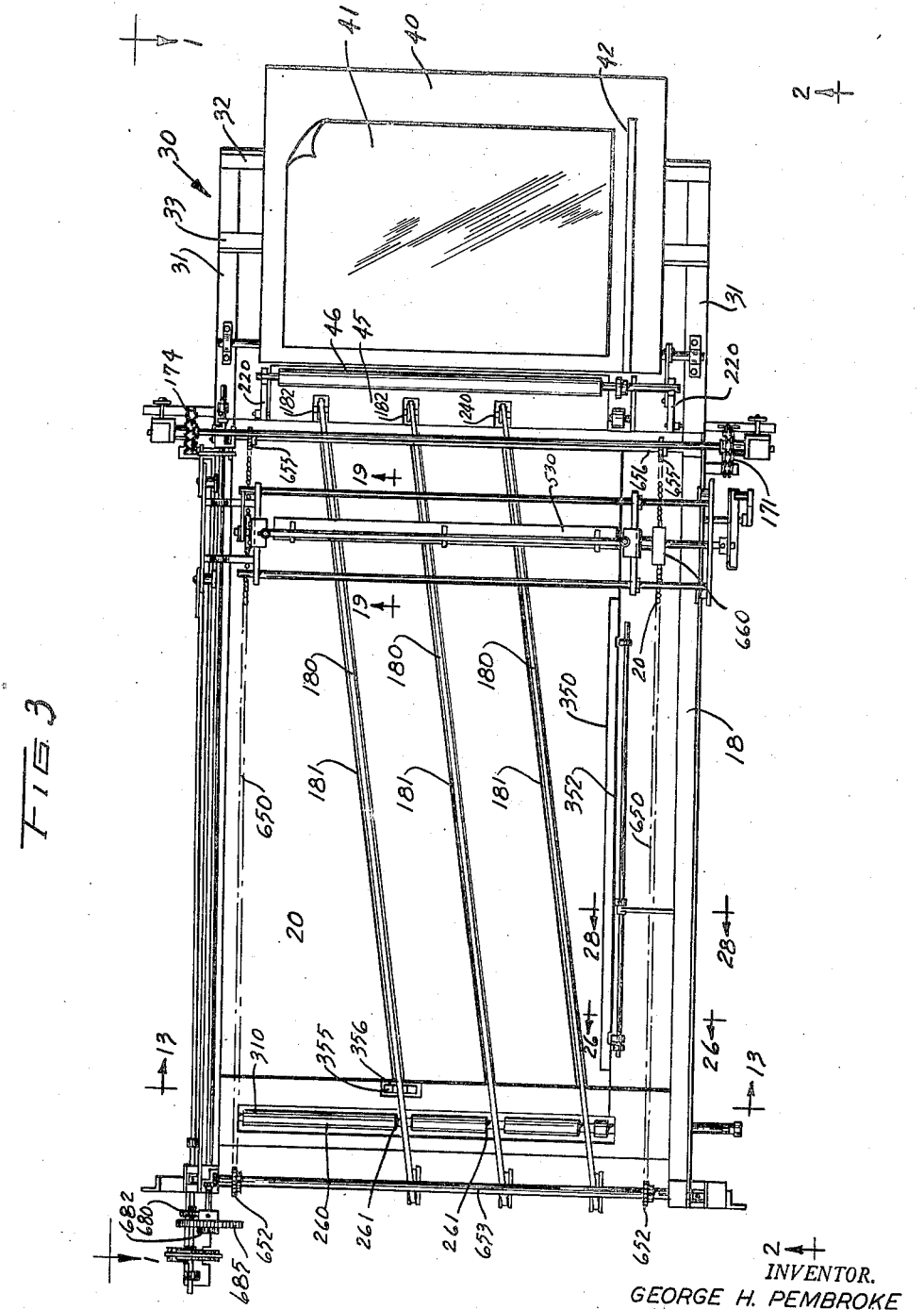

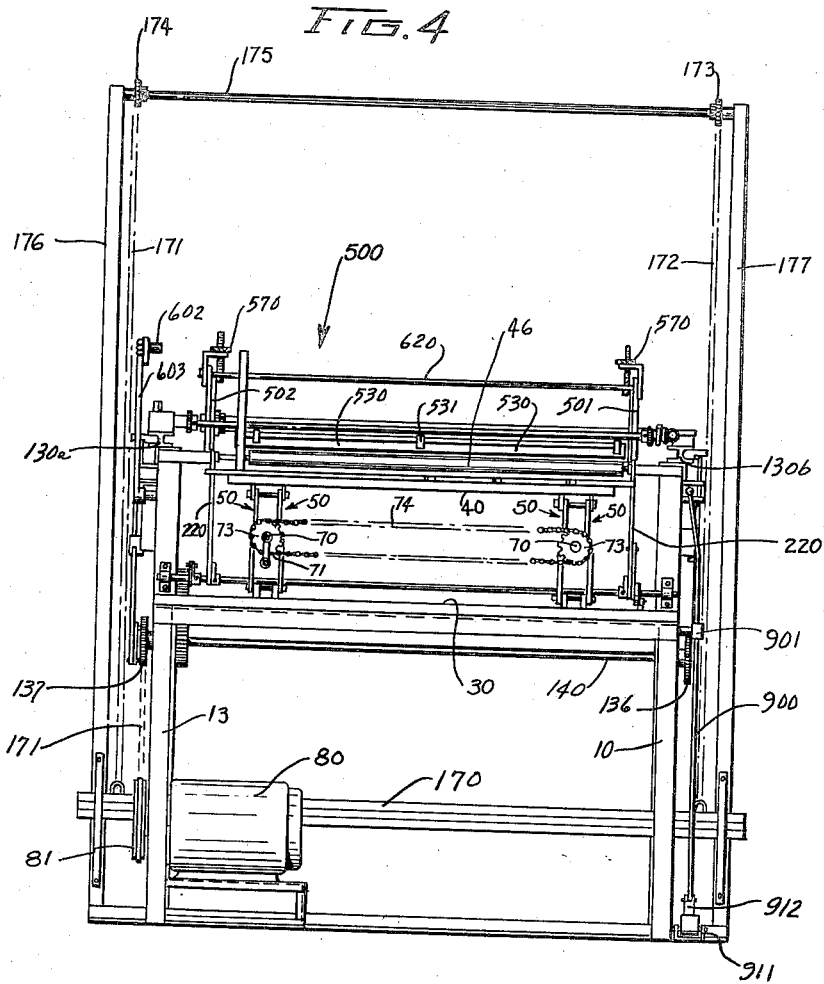

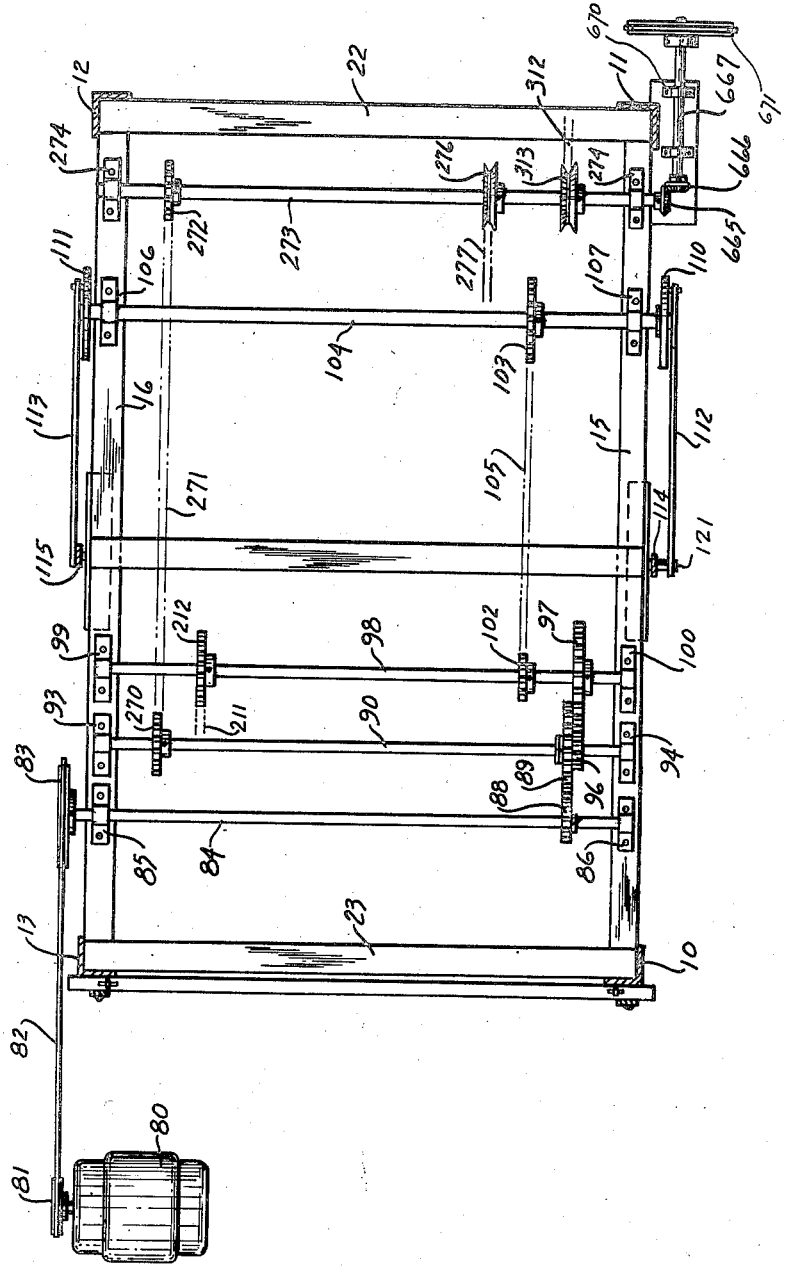

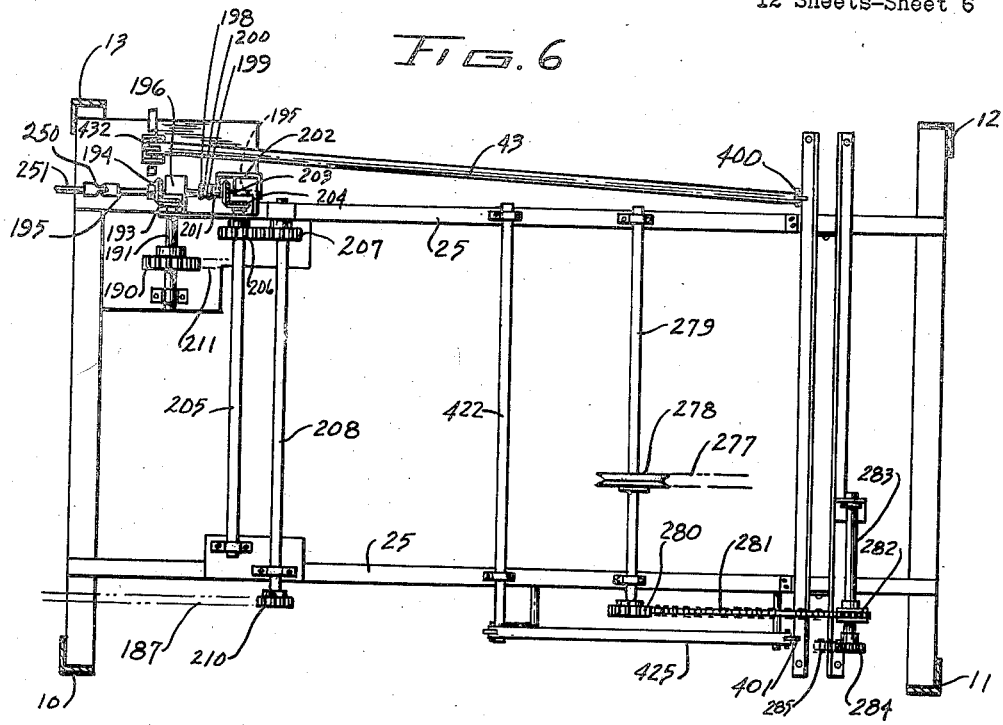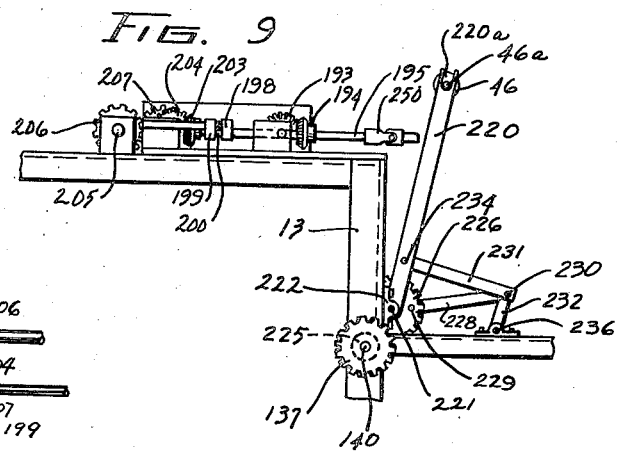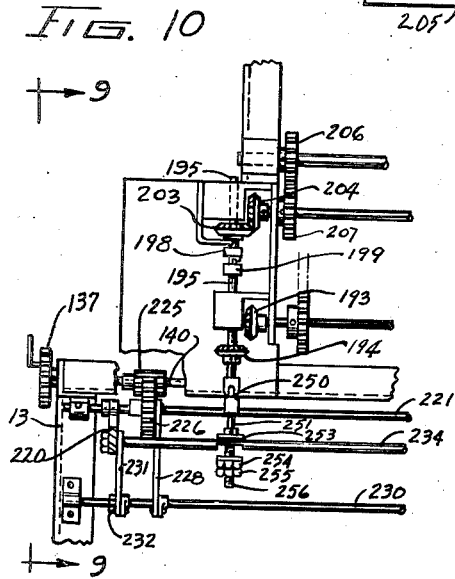

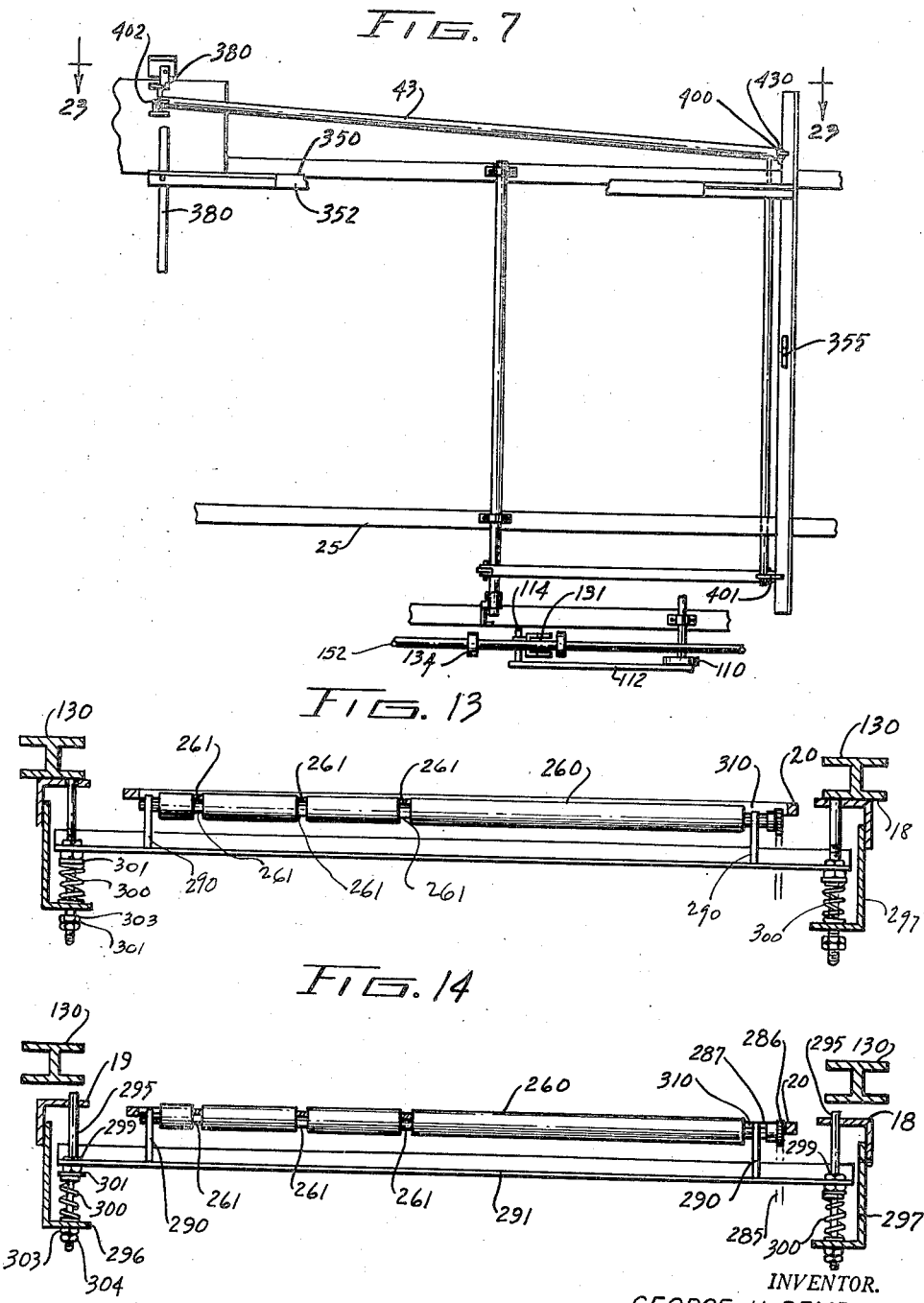

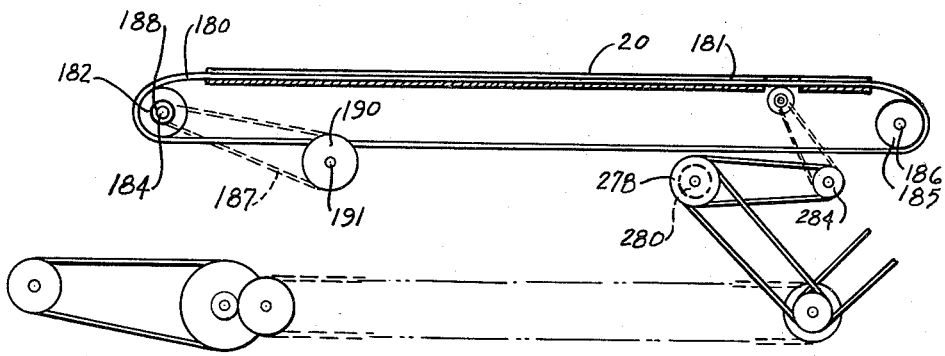
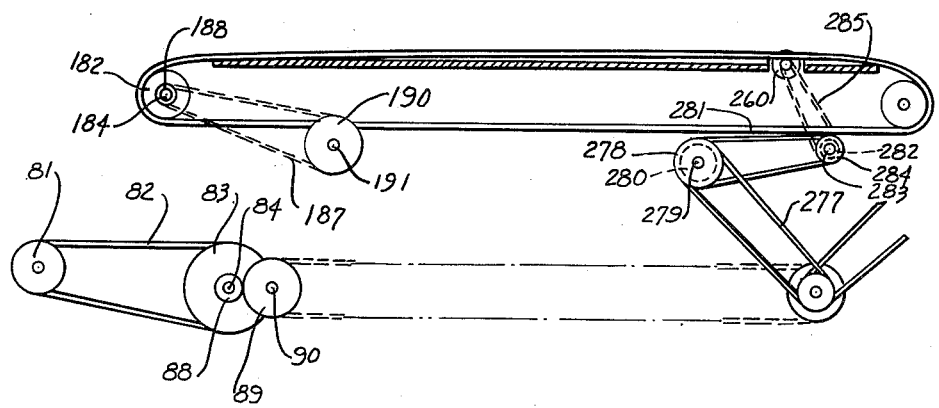

April 10, 1951 G. H. PEMBROKE 2,548,119
STENCIL PRINTING MACHINE
Filed May 20, 1947 12 Sheets-Sheet 10
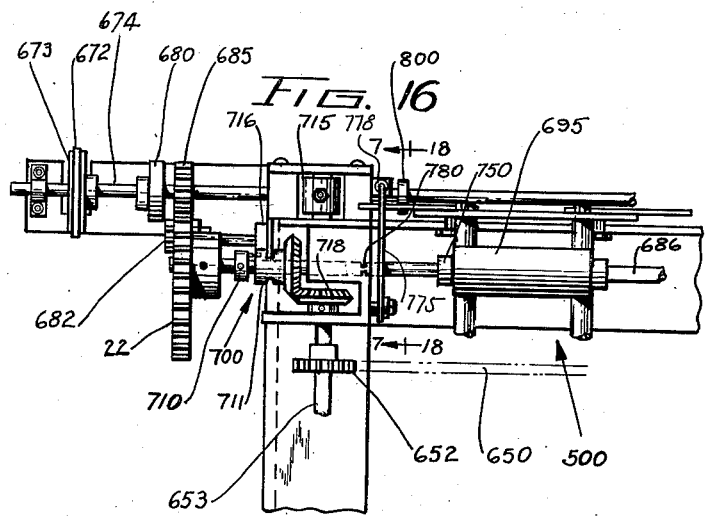
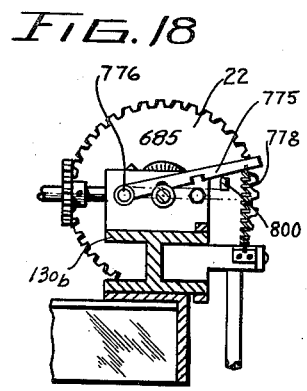
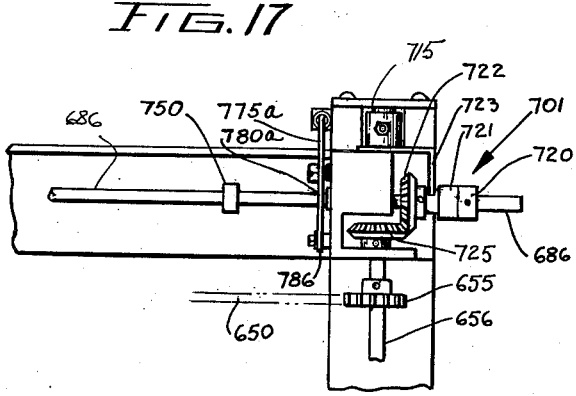
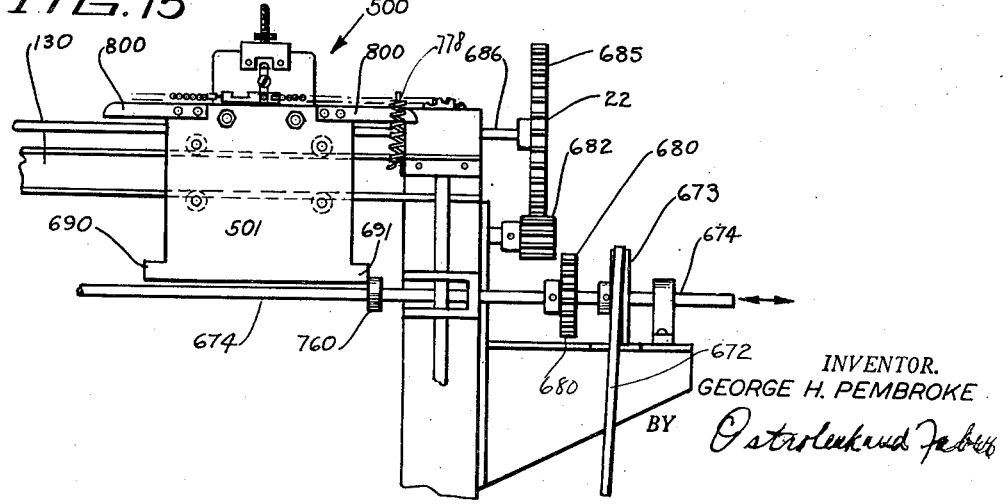
INVENTOR.
GEORGE H. PEMBROKE
ATTORNEYS

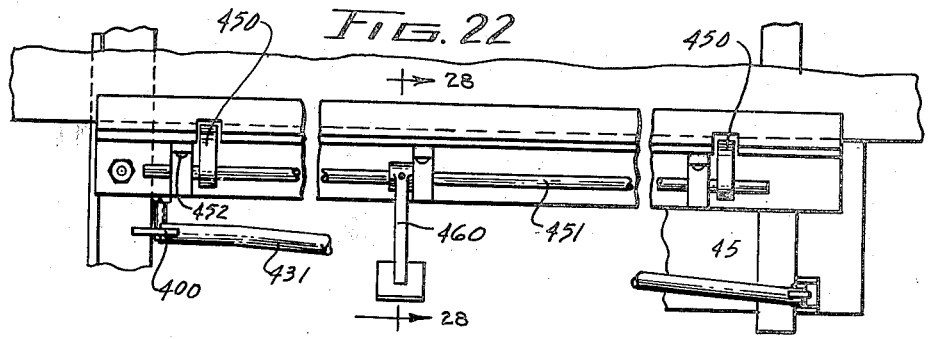
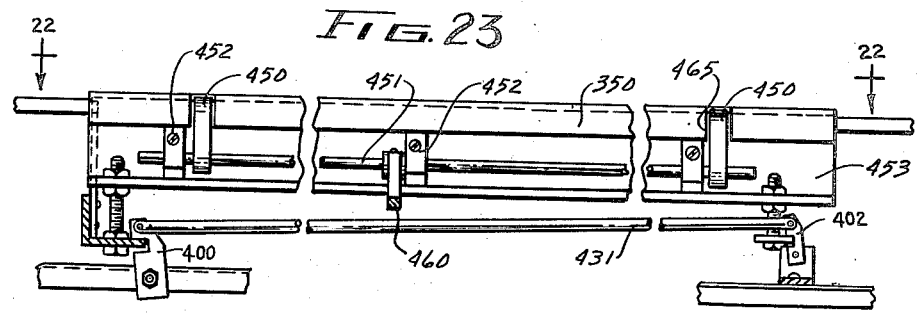
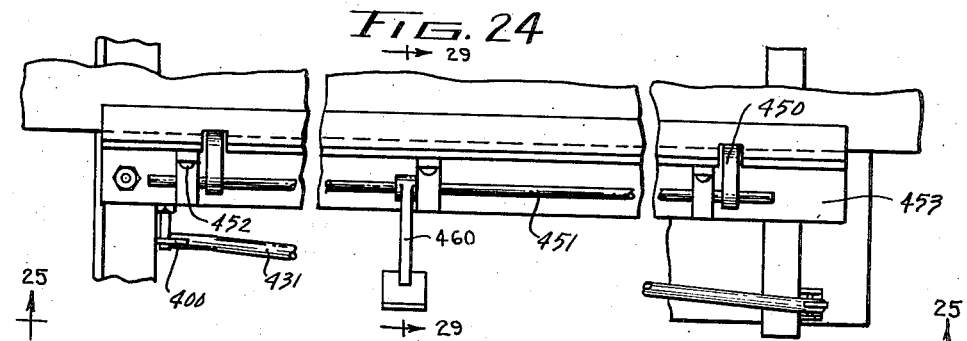
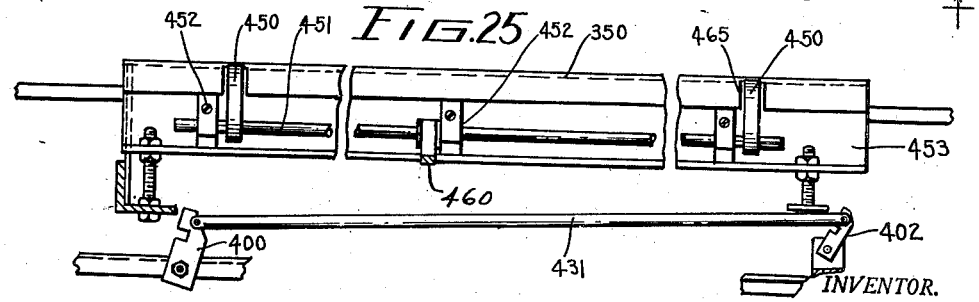

April 10, 1951 G. H. PEMBROKE 2,548,119
STENCIL PRINTING MACHINE
Filed May 20, 1947 12 Sheets-Sheet 12
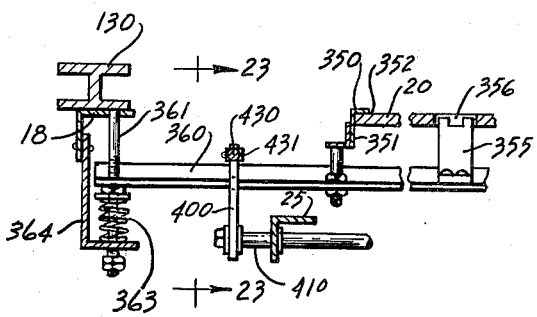
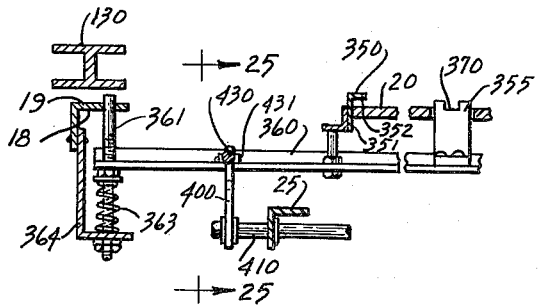
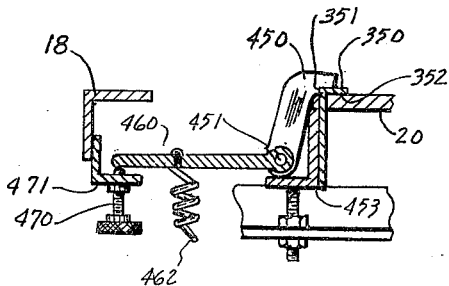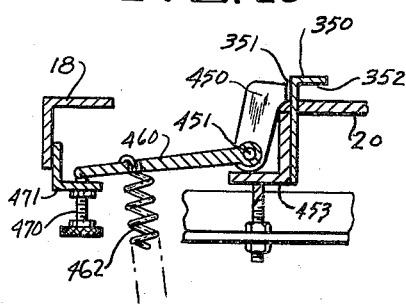
INVENTOR.
GEORGE H. PEMBROKE
BY
ATTORNEYS Patented Apr. 10, 1951

2,548,119

UNITED STATES PATENT OFFICE 2,548,119

STENCIL PRINTING MACHINE

George H. Pembroke, New York, N. Y.

Application May 20, 1947, Serial No. 749,120

11 Claims. (Cl. 101—126)

My present invention is an improvement of my application Serial No. 687,846 filed August 2, 1946, for Silk Screen Printing Apparatus, which application is now abandoned, and relates to stenciling apparatus and more particularly to apparatus primarily designed for utilization in connection with silk screen processes.

A primary object of my invention is the provision of a stencilling machine of the silk screen type with a horizontal table to receive the sheet upon which the stencil is to be marked and with a frame for holding the silk screen or other stencil; the said frame being alternately raised and lowered automatically in timed relation to the feeding of the blank onto the table and to the movement of the ink spreader apparatus over the stencil.

A further object of my invention is the provision of novel apparatus for raising and lowering the frame for the silk screen or other stencil, the said means comprising a single oscillating lever movable in one direction to raise the screen frame and in the other direction to lower the screen frame in conjunction with appropriate yielding means to maintain the screen frame in the raised or lowered positions for predetermined timed intervals.

Essentially, the means for raising and lowering the screen frame comprises a driven eccentric member or crank pin connected to the lower end of an oscillating lever, providing a forward and backward stroke, which in turn at the upper end connects with an oscillating shaft also having a forward and backward movement, but a longer stroke than the cam or eccentric stroke itself. This is accomplished by means of pivoting the lower end of the lever and connecting the lever to the eccentric off center, nearer to the pivot point, providing about double the throw to the lever as compared to the eccentric throw.

The eccentric lever with a fork-shaped head plays at the upper end between two collars on an oscillating shaft, which shaft controls the raising and lowering of the screen frame.

A specific improvement in my present invention comprises the connection between the oscillating bar operated by the eccentric lever and the screen table itself. The oscillating bar is connected by a chain to sprockets at opposite ends of the machine frame, which sprockets in turn are connected by a crank pin and connecting links to the screen frame, thereby operating to raise and lower the frame in accordance with the oscillation of the eccentric lever.

Another object of my invention is the provision of novel ink applying and spreading means operative in timed relation to the lowering of the screen frame on to the blank on the table, the said ink applying means being operative in one direction when the frame is first lowered, halting its operation when the frame is raised and being operative in the opposite direction when the frame is lowered once more.

In connection therewith, another object of my invention is the provision of novel ink applying operating means, the direction of operation of which will be automatically altered when the screen frame is raised at the end of the inking stroke in one direction.

Another object of my invention is the arrangement of ink applying means comprising a single spreader so constructed that it will be automatically shifted to a trailing position each time the screen is raised for sheet delivery and sheet feeding purposes at the end of an inking stroke.

Another improvement embodied in my present invention includes novel adjustable sheet feeding means, novel sheet registering means and novel sheet delivery means.

The foregoing and many other objects of my invention will become apparent in the following description and drawings in which:

Figure 1 is a side view taken from the right side of my novel silk screen printing device taken from line 1—1 of Figure 3.

Figure 2 is a side view taken from the left side of my novel silk screen printing device taken from line 2—2 of Figure 3.

Figure 3 is a top plan view of my novel silk screen printing machine.

Figure 4 is an end elevation of the feeding end of my novel silk screen printing device.

Figure 5 is a plan view partly in cross section of the operating mechanism for my novel silk screen printing machine taken from line 5—5 of Figure 1.

Figure 6 is a plan view partly in cross section of specific silk screen printing table operating elements taken from line 6—6 of Figure 1.

Figure 7 is a plan view corresponding substantially to the plan view of Figure 6 showing, however, the relationship between the paper clamp at the left side of the printing table and the paper stop at the rear end of the printing table.

Figure 8 is an elevation partly in cross-section taken from line 8—8 of Figure 3 showing the printing table, the silk screen frame and the squeegee apparatus.

Figure 9 is a side view of a portion of the paper feed element taken from line 9—9 of Figure 10.

Figure 10 is a top plan view partly in cross-section taken from line 10—10 of Figure 1.

Figure 11 is a schematic view showing the drive for the feed and registering belts on the printing table which drive is under the control of the feed apparatus shown in Figures 9 and 10. The position of Figure 11 corresponds to the unengaged position of the gear and clutch mechanism of Figure 10.

Figure 12 is a schematic view corresponding to that of Figure 11 showing the feed belts of Figure 11 raised in order to perform the intended operation of moving the paper on to the table in the proper position thereon. When the belt has been raised to the position of Figure 12, the driving elements of Figure 10 are engaged. At the same time, the idling roller at the delivery end of the belt has been raised as shown in Figure 14 to raise the belts above the level of the table to cause them to feed the paper.

Figure 13 is a cross-sectional view taken on line 13—13 of Figure 3 looking in the direction of the arrows and showing position of the idler roller at the delivery end of the table corresponding to the schematic position of Figure 11.

Figure 14 is a view corresponding to that of Figure 13 but showing the up or operating position of the idling roller at the delivery end of the table corresponding to the schematic view of Figure 12.

Figure 15 is a side elevation of a portion of the screen carriage showing the squeegee carriage at the end of its stroke; this view corresponds to Figure 1 showing the squeegee carriage, however, at the right hand end of Figure 1 rather than at the left hand end as in Figure 1.

Figure 16 is a plan view of a corner of the screen carriage corresponding to the upper left-hand corner of Figure 3 showing the squeegee carriage moved from the right-hand end of Figure 3 to the left-hand end of Figure 3.

Figure 17 is a detail plan view of a portion of the upper right-hand corner of Figure 3.

Figure 18 is an elevation partly in cross-section taken on line 18—18 of Figure 16.

Figure 19 is a cross-sectional view taken on line 19—19 of Figure 3 looking in the direction of the arrows and showing the alternate positions of the squeegee.

Figure 20 is a side elevation partly in cross-section taken on line 20—20 of Figure 8 looking in the direction of the arrows.

Figure 21 is a cross-sectional view showing the operating elements of the squeegee carriage taken on line 21—21 of Figure 20 looking in the direction of the arrows.

Figure 22 is an enlarged top plan view of the left-hand end of the printing table showing the clamp and stop operating elements and is taken on line 22—22 of Figure 23.

Figure 23 is a side view taken on line 23—23 of Figure 7.

Figure 24 is a view corresponding to that of Figure 22 showing the released position of the elements thereof.

Figure 25 is a cross-sectional view taken on line 25—25 of Figure 24.

Figure 26 is a cross-sectional view taken on line 26—26 of Figure 3 looking in the direction of the arrows with the screen carrier down.

Figure 27 is a view corresponding to that of Figure 26 showing the screen carrier up.

Figure 28 is a cross-sectional view taken on line 28—28 of Figure 3 showing the sheet registering unit with the screen carrier frame in the up position.

Figure 29 is a view corresponding to that of Figure 28 showing the screen carrier frame in the down position.

Referring now to Figures 1 to 5, the machine comprises a main frame having principal vertical posts 10, 11, 12, and 13.

The legs 12 and 13 are connected at their lower ends by longitudinal side frame members 15 and 16 and at their upper ends by the longitudinal side members 18 and 19 which define the sides of the work table 20.

The frame is also provided with the lower cross members 22 and 23 connecting, respectively, the legs 12 and 11 at the delivery end and the legs 13 and 10 at the feed end of the machine. The legs 10 and 13 at the front end and 11 and 12 at the delivery end are interbraced in any suitable manner to provide supports for additional elements including the longitudinal intermediate frame members 25, 25 which carry the upper section of the operating mechanism.

The front of the machine is also provided with a frame extension 30 comprising the longitudinal bars 31, 31 and the cross bars 32 and 33 supported at the front end by the legs 34 and 35 and at the inner end between the front leg members 10 and 13.

The front frame 30 provides a suitable support for the stacking table 40 on which the sheets 41 to be fed into the mechanism are mounted against the side guage 42. The table 40 is adjustable vertically in order to register a desired portion of the stack 41 with the feeding slat 45 on to which the paper sheets are first pushed to be engaged by the feed-in roller 56, the operation of which is hereinafter described.

Adjustable support for table 40 comprises the extensible support 50 which includes the upper links 51 and 52 and the lower links 53 and 54. The lower end of link 54 may be pivotally secured at 55 to a suitable support 56 on the lower platform 30. The lower end of link 53 may be pivotally secured at 57 to the element 56. Link 53a is connected between pivot 58 on link 54 and pivot 61.

The upper links 51 and 52 are pivotally secured, respectively, at pivots 60 and 61 to the lower links 53 and 54. The links 51 and 52 are pivotally secured at 65, 66 to the underside of table 40. Link 52a is connected between pivot 63 on link 51 and pivot 62.

A pair of extensible support elements 50 may be used on each side with their pivots 60 and 61 appropriately interconnected for simultaneous operation. The pivots 60 and 61 include a nut in one element through which is threaded the screw 70 having the crank handle 71 and a collar in the other element rotatably holding screw 70. Turning the screw 70 by the crank handle 71 will result in collapsing or extending the extensible member 50 and thus raising or lowering the feed table 40.

The additional feeding element which times the feed of the paper into the machine by means of the operation of feed roll 46 with respect to the feeding slat 45 will be further described after other basic elements of the machine have been set forth.

As seen in Figure 4, a pair of extensible elements 50, 50 is provided with each side of the feed table 40. While a screw 70 is needed on both sides, only one of the screws 70 need have the handle 71. Each of the screws 70 may be provided with a sprocket 73, 73 connected by a chain 74 for common operation.

A motor 80 drives the pulley 81 (see especially Figure 5 as well as Figure 1) which through the belt 82 drives pulley 83 secured to shaft 84 rotatable in bearings 85, 86 secured on the lower longitudinal frame members 15 and 16.

Gear 88 on shaft 84 meshes with and drives gear 89 on shaft 90, which shaft is also rotatably mounted in bearings 93 and 94 on the lower frame members 16 and 15. Gear 96 on shaft 90 meshes with and drives gear 97 on shaft 98 rotatably secured in bearings 99 and 100 across the lower frame members 15 and 16.

Sprocket 102 on shaft 98 drives sprocket 103 on shaft 102 through the chain 105. Shaft 104 is rotatably mounted in bearings 106 and 107 on the lower frame members 15 and 16.

The outer end of shaft 104 beyond the lower frame members 15 and 16 carries the crank discs 110 and 111, respectively. Each of the crank discs 110 and 111 is connected by the link 112, 113 to the oscillating arms 114 and 115 on opposite sides of the machine.

Each of the arms 114 and 115 is supported on its lower frame member 15 and 16, respectively, by the downwardly depending V-shaped bracket 118, 119 having the pivot 120 and secured to the lower frame member 15 and 16 on each side.

The oscillating arms 114 and 115 on each side are, as above pointed out, pivotally mounted on the pivots 120 and are connected, respectively, by pivots 121 and 122 to the links 112 and 113. Consequently, the operation of the motor 80 will through the gear train above pointed out cause the crank discs 110 and 111 to rotate and will through the connecting links 112 and 113 cause the oscillating arms 114 and 115 to move back and forth in order to raise and lower the screen carriage 130 in the manner described below.

The upper end of each of the oscillating arms 114 and 115 is bifurcated at 131 to surround and engage the longitudinally oscillating bars 132, 132 on each side. Adjustable collars 133, 134 are provided on each of the oscillating bars 132 in order to provide an abutment against the side of the bifurcating extension 131 of the arms 114 and 115 to push the oscillating bars 132 back and forth.

Each of the oscillating bars 132 is supported at opposite ends by the chain 135 which passes around the front sprockets 136, 137 and the rear sprockets 138, 139. As the oscillating arms 114 and 115 oscillate back and forth, they alternately bear against the collars 133 on the oscillating bars 132 and the collars 134 thereon, thus causing the bars 132 to move back and forth.

This, therefore, causes the chain 135 on each side to move back and forth and hence rotates the sprockets 136—137 and 138—139 back and forth.

Sprockets 136 and 137 are connected by the shaft 140 mounted in appropriate bearings in legs 10 and 13. Sprockets 138 and 139 rotate on shaft 142 mounted in appropriate bearings through legs 11 and 12—the shafts 140 and 142 rotating with their sprockets.

Each end of the shaft for sprockets 136 and 137 is provided with a relatively short crank 145, 145 thereto.

Each of the cranks 145 is connected at pivot 150 to the longer link 151. Each of the links 151 is connected by an appropriate pivot 152 to the push bar 153 on each side attached in any appropriate manner to the underside of the front end of the screen frame 130. Push bar 153 rides in a suitable vertical bearing 154 secured on each side to the leg members 13 and 10.

It will thus be seen that rotation of sprockets 137 and 136 will cause the road 153 on each side connected to the front end of the screen frame 130 alternately to rise and fall from the position of Figure 1 to the position of Figure 2 and back again.

Similarly, sprockets 138 and 139 at the delivery end of the mechanism are connected by the short cranks 160 on their shaft and the long links 161 to the push rods 162 which in turn are connected to the delivery or rear end of the screen table 130 on each side.

Consequently, the operation of sprockets 139 and 138 will alternately cause the rear end of the screen frame 130 to rise and then fall. Links 151 and cranks 145 at the front end are, respectively, longer than links 161 and cranks 160 at the delivery end so that when the screen frame 130 rises, the front end rises higher than the rear end, as seen particularly in Figure 2. This makes it possible for the operator of the machine at the front end better to observe the action of the apparatus on the paper sheet to which a stencil is being applied and also makes access to the table easier for the operator.

This also makes it easier to insert a silk screen in the screen frame 130 in the manner previously described in connection with my prior application Serial No. 687,846 filed August 2, 1946.

In addition, and in order to facilitate the extra lift or rise given in the front end of the screen frame 130, the front end of the screen is counterbalanced by the weight 170 comprising a cross bar connected by chains 171 and 172 passing over the sprockets 173 and 174 and secured to the front end of the screen frame 130.

The sprockets 173 and 174 are mounted on the cross shaft 175 carried between the vertical posts 176 and 177 at the front or delivery end of the machine. It will thus be obvious that as the oscillating arms 114 and 115 are moved back and forth by the motor 80 working through the gear train 88, 89, 96, and 100 to drive the sprockets 102 and 103 which in turn drive the crank discs 110 and 111, the oscillating bars 132 are moved longitudinally back and forth.

When the oscillating bars 114 and 115 are moved toward the back of the machine, as shown in Figure 1, then the sprockets 136 and 139 are rotated to the position shown in Figure 1 where the links 161 and 151 are pulled down to pull down the screen table.

The position of Figure 1 is that which the machine reaches just after the screen frame 130 has been pulled down with the inking carriage, hereinafter to be described, just beginning to move over the screen frame from one end of the frame to the other.

The oscillating arm 114 is shown commencing its return oscillation toward the left with respect to Figure 1, which oscillation will be completed just after the inking carriage has reached the right-hand side or delivery end of the machine with respect to Figure 1.

At this time, the end 131 of oscillating arm 114 (as well as of oscillating arm 115) will strike the collar 134 and release a latching element hereinafter described to release the paper stop and clamping units, also hereinafter to be described.

At the same time, the movement of bifurcated end 131 of oscillating arms 114 and 115 against the collars 134 will move the oscillating bars 132 to the left with respect to Figure 1, thus rotating sprockets 136 and 138 in a counterclockwise direction to a position where the links 145 and 151 at the front and 160 and 161 at the rear will be extended in a substantially straight line to cause the screen frame 130 to rise from the position of Figure 1 to the position of Figure 2.

In Figure 2, on the opposite side of the machine, the completion of this rising operation for the screen frame 130 has been shown. At this time, the stencilled sheet is fed out of the machine at the delivery end, which is the left side of Figure 2, and the right side of Figure 1, and a sheet to be stencilled is fed in at the left side of Figure 1 or the right side of Figure 2.

The screen frame 130 is up long enough for this delivery and feeding operation to be completed, while the bifurcated end 131 of oscillating arm 115 moves toward the collar 133. Oscillating arm 114, of course, moves simultaneously with arm 115.

When the oscillating arm 115 now strikes the collar 133, it moves the oscillating bar 132 to the left with respect to Figure 2 rotating the sprockets 139 and 137 (and their corresponding sprockets 138 and 136) in an opposite direction to cause the screen frame 130 to move from the position of Figure 2 down once more back to the position of Figure 1.

At this time, the inking carriage which has moved to the opposite side of the mechanism is now operated to move back to the initial side of the mechanism during the return stroke of the oscillating arms 114 and 115 to the position where they will once more raise the screen frame.

Thus, it will be clear that the screen frame is caused to rise at the completion of the movement of the oscillating arms 114 toward the front or feed end of the mechanism and is caused to be lowered at the completion of the movement of the oscillating arms 114 and 115 toward the delivery or rear end of the mechanism.

The screen frame remains down while the oscillating arms 114 and 115 move from the delivery to the feed end of the mechanism and the screen frame remains up while the oscillating arms 114 and 115 move from the feed to the delivery end of the mechanism.

The inking carriage, hereinafter to be described, moves in one direction during the down cycle of the screen frame 130, then remains at the end of its stroke during the up cycle of the screen frame and then moves back in the opposite direction during the next down cycle of the screen frame 130.

Thus, the oscillating arms go through a complete back and forth cycle for each rising and lowering of the frame, while the inking carriage goes through one-half of a cycle for each rising and lowering of the frame.

When the screen frame 130 rises, it is necessary to feed in a paper blank on which a stencil is to be printed and, at the same time, deliver or feed out the paper on which a stencil has already been printed. For this purpose, a plurality of belts 180 are provided registering with grooves 181 in the surface of the table 20 (Figures 3, 11, and 12).

The belts 180 pass over the driving pulleys 182 mounted on driven shaft 184 at the front end of the mechanism, pass diagonally across the table registering with the grooves 181, and then pass over the idler pulleys 185 on shaft 186 at the rear or delivery end of the mechanism.

The shaft 184 for the driving pulleys 182 of the belts 180 are driven by chain 187 which engages the sprocket 188 on shaft 184 and which chain is driven by the sprocket 210 on shaft 208 (Figure 6) mounted in appropriate bearings across the intermediate longitudinal frame members 25.

Shaft 210 is driven from shaft 191 as hereinafter described.

Shaft 191 is continuously driven by sprocket 190, chain 211 and sprocket 212 on shaft 98 (Figures 5 and 6). The shaft 191 is provided on its left side with respect to the feed end of the machine (at the top of Figure 6) with a bevel gear 193 which may mesh with the bevel gear 194 on the longitudinally movable shaft 195 which is rotatably mounted in and longitudinally movable with respect to the bracket 196.

The delivery end of the longitudinally movable shaft 195 is provided with a clutch engaging element 198 which may engage with the opposite clutch engaging element 199 of the clutch 200 mounted on the end of shaft 201, which in turn is rotatably mounted in bracket 202.

Shaft 201 carries at its delivery end the bevel gear 203 which meshes with bevel gear 204 on shaft 205 mounted in appropriate bearings across the intermediate frame members 25.

Shaft 205 is provided with gear 206 which meshes with gear 207 on shaft 208 which in turn is also mounted in suitable bearings across the intermediate frame members 25. The shaft 208 is connected by the sprocket 210 and chain 187 to sprocket 188 on shaft 184.

Thus, the belts 180 are driven by the driving pulleys 182 on shaft 184 only when the bevel gear 194 on the clutch shaft 195 is in engagement with the bevel gear 193 on shaft 191 which carries the sprocket 190, which in turn drives the shaft 184 of belts 180.

When the bevel gear 194 is disengaged from bevel gear 193, then there is no drive to the belts 180 since this drive is broken at the said bevel gears. Thus, when it is necessary to drive the belts 180, the drive from sprocket 212, Figure 5, in the bottom frame portion of the machine must be complete through chain 211 to sprocket 190 on shaft 191, then through bevel gears 194 and 193, to the shaft 201, then through the clutch 200 to bevel gears 203 and 204 to gears 206 and 207 to drive shaft 208 and sprocket 210 and then by chain 187 and sprocket 188 to drive the belt drive shaft 184.

The feed mechanism which includes the feed-in roller 46 which cooperates with the feed slat 45 also controls the energization or de-energization of belts 180 through the bevel gears 194 and 193 and the clutch 200.

The feed-in roller 46 is mounted across the arms 220, the lower ends of which are pivotally mounted on the cross shaft 221 which is held in any appropriate manner as, for instance, by the brackets 222 on the front legs 10 and 13 of the machine.

The shaft 140 which carries the front sprockets 136 and 137 which in turn serve to raise and lower the screen frame 130 also carries just inside the leg 13 the spur gear 225 which meshes with the gear 226 on the cross bar or shaft 221 on which the arms 220 operate.

Gear 226 has a link 228 eccentrically secured thereto at the pin 229. The opposite end of link 228 is connected by shaft 230 to links 231 and 232 (see particularly Figures 1, 2, and 9). Link 231 is connected between the outer end of link 228 being connected to link 228 as above pointed out by shaft 230 and the shaft 234 on arm 220.

Link 232 is connected between shaft 230 and the cross bar 236 mounted in appropriate brackets on the frame 30. The mechanism is so arranged, therefore, that when the sprockets 136 and 137 are operated from the position of Figure 1 to the position of Figure 2 to raise the screen frame 130, as shown in Figure 2, the gear 226 is rotated to pull the link 228 toward the left with respect to Figures 9 and 2 and thus drive the link 231 toward the left, which in turn will result in driving the arm 220 to the left.

The link mechanism 228—231—232 and the gears 226 and 225 are repeated on the opposite side of the machine so that both arms 220 are driven on both sides of the machine. Thus, the arms 220, as above pointed out, are driven in toward the slat 45 when the screen frame is raised.

The pulleys 182 which drive the belts 180 project upwardly through notches 240 in the cross slat 45 so that the belts 180 at the feed end of the mechanism are above the level of the cross slat 45.

Consequently, when the arms 220 are driven in toward the pulleys 182, the roller 46 engages the belts 180 on the pulleys 182. The roller 46 is a heavy friction surface roller supported by the pins 46a in the notches 220a at the top of the arms 220. Consequently no accurate adjustments are required, but the roller 46 may ride up slightly on the portion of belts 180 over pulleys 182 when the arm 220 is driven in, thus ensuring an appropriate pressure engagement between the roller 46 and the feed end of belts 180 and permitting the roller 46 to yield upwardly slightly in order to ensure such pressure and to prevent buckling or breakage of any of the elements.

Thus, when the screen frame 130 is raised as shown in Figure 2, a sheet 41 which has been placed on the slat 45 against the feed end of the belts 180 will be pressed by the roller 46 in the manner above described against the feed end of belts 180 so that the belts may draw the sheet 41 in.

In actual operation, when the screen frame 130 is down in the position of Figure 1, the arms 220 have moved back to a position where the roller 46 just clears the feed-in slat 45. The belts 180 are not operating at this time as will shortly be pointed out.

The operator feeds a sheet of paper 41 on which a stencil is to be made on to the feed-in slat 45 and under the roller 46 up to the portion of belts 180 on the drive pulleys 182. When the screen frame 130 is raised to the position of Figure 2, then this operation simultaneously moves in the arms 220 and simultaneously causes the belts 180 to move.

Thus, the roller 46 is moved in, as above pointed out, to push the leading edge of the paper against the belts and thus permit the belts to draw the paper on to the table 20.

When the screen frame 130 moves down once more, the roller 46 moves back again so that all elements are in the position of Figure 1 and the operator may once more place a sheet 41 in proper position to be engaged to be fed in on the next screen lifting operation.

The movement of arms 220 which carry the roller 46 into the feed-in position also serves to engage bevel gears 194 and 193 and clutch 200 to drive the belts 180. The drive for the belts 180 through the clutch 200 and bevel gears 193 and 194 has already been described.

It was pointed out above that bevel gear 194 and clutch element 198 are mounted on the longitudinally movable shaft 195. Longitudinally movable shaft 195 is connected at the feed end of the machine by a universal joint 250 to the push bar 251, which in turn passes through an appropriate opening in the cross bar or shaft 234 between the feed-in roller carrying arms 220.

A suitable collar 253 is secured to the push bar 251 on the rear of the cross bar shaft 234, and a suitable adjustable nut 254 with an appropriate lock nut 255 are secured on the front threaded end 256 of the push bar 251. When the arms 220 carrying the roller 46 are operated to the feed-in position, the cross bar 234 moves up with respect to Figure 10 toward the rear end of the machine, pushing the push bar 251 and the longitudinally slidable bar 195 to the right with respect to Figure 6.

This causes the bevel gears 194 and 193 to engage and also engages the clutch elements 198 and 199 so that the drive to shaft 191 previously described is completed. This effects a drive to the belts 180 through sprockets 190 and 188 and chain 187, all as above described.

Thus, the belts 180 are operated to move across the table 20 only when the feed-in cross arms 220 and their roller 46 are in the feed-in position; but since the cross arms 220 are in the feed-in position only when the screen frame 130 is raised, then the belts 180 are caused to move across the face of the table 20 only when the screen frame 130 is raised.

When the screen frame 130 is dropped, then, as above pointed out, the roller carrying arms 220 are moved outwardly and this, through the nut 254, pulls out the push bar 251 and the longitudinally slidable shaft 195 to disengage the bevel gears 194 and 193 and to disengage the elements 198 and 199 of the clutch 200.

Thus, when the screen frame is lowered, the belts 180 are halted. As above pointed out, the belts 180 ride in grooves 181 in the table 20. The grooves 181 are of sufficient depth so that the belts 180 may rest therein at least flush with the surface of table 20. It thus becomes necessary to raise the belts 180 out of the grooves 181 above the level of the table 20 when it is desired to operate the belts 180.

For this purpose, a driven feed-out roller 260 is provided, the said roller being appropriately notched at 261, 261 to guide and control the belts 180 which pass thereover as shown in Figures 3, 13, 14, 11 and 12.

The roller 260 is driven from the motor 80 (Figure 5) through pulley 81, belt 82, pulley 83, shaft 84, gear 88, gear 89, shaft 90 which carries the sprocket 270. Sprocket 270 is connected by chain 271 to sprocket 272 on cross shaft 273 which is mounted in appropriate bearings 274, 274 across the base frame members 15 and 16.

Pulley 276 on shaft 273 is connected by belt 277 to the pulley 278 on the cross shaft 279 carried between the intermediate longitudinal frame members 25. Sprocket 280 on shaft 279 drives the chain 281 which drives sprocket 282 on shaft 283. Sprocket 284 on shaft 283 drives the chain 285 which drives the sprocket 286 on shaft 287 of the feed-out roller 260.

The feed-out roller 260 is mounted in appropriate bearings in the vertical standards 290, 290 on the cross bar 291 which is mounted just beneath the table frame 19. Cross bar 291 is mounted on the vertical rods 295 which pass through appropriate openings in brackets 296, 297 secured beneath the table frame 19.

The said rods 295 are secured to the bracket in any suitable manner as, for instance, by arranging the rods 295 so that the lower half section thereof is threaded and by passing the rods 295 through appropriate openings in the cross bar 291 and securing them thereto by appropriate nuts 299.

A compression spring 300 on each side is captured between an appropriate washer 301 beneath the nuts 299 and the lower horizontal surface of brackets 297. The compressing of spring 300 is determined by the adjustable nut 303 and lock nut 304. The springs 300 tend to drive the rods 295 up as shown in Figure 14 to a position where the upper side of roller 260 is above the upper surface of table 20.

The roller 260 is rotatably mounted as will be obvious from an inspection of Figures 3, 13, and 14 in the slot 310 in table 20. When the roller 260 is in the position of Figure 14 above the upper surface of table 20, then the notches 261 in the roller 260 lift the belts 280 from the position of Figure 11 to the position of Figure 12, lifting the belts from a position where they are flush with the surface of the table 20 to a position where they are above the surface of the table 20 and thus may feed a sheet of paper longitudinally across the table 20.

At the same time, when the upper surface of roller 260 has been raised above the upper surface of table 20, a sheet of paper which has been moved out partly by the belts 180 will ride on the upper surface of the roller 260 which will feed the sheet of paper out to appropriate delivery mechanism.

Any appropriate delivery mechanism may be used and the said delivery mechanism which may consist of a delivery belt or belts may be driven by the belt 312, Figure 5, on pulley 313 which is driven by the shaft 273.

When the roller 260 is lowered to the position of Figures 13 and 11, then the belts 180 drop down into the notches 181 and at the same time, as pointed out below, the roller 260 drops down to a position where it does not interfere with anything on the table.

The position of the roller 260 is automatically controlled by the position of the screen frame 130 which moves down into engagement with the table frame 19 as shown in Figure 13 to operate the roller 260 from the up position of Figure 14 to the down position of Figure 13.

When the screen frame 130 is down, it pushes down the rods 295 thus pushing down the cross bar 291 and thereby pushing down the roller 260 to a position below the top surface of the table 20 wherein both the roller 260 and the belts 180 are flush with or below the level of the table, as shown in Figure 11.

When the screen frame 130 rises, then the compression springs 309 move up the bracket 291 and accordingly move up the roller 260 to a feed-out position while, at the same time, moving up the belts 180 to a position where they will move a sheet across the surface of table 20. Thus, it will be seen that in addition to a feed-in mechanism controlled by the raising and lowering of the frame, the movement, both the starting and stopping, of the belts is controlled by the raising and lowering of the frame through the clutch mechanism which in turn is controlled by the feed-in mechanism and at the same time the height of the belts above the table and the position of the feed-out roller for cooperation with a sheet is also controlled by the position of the screen frame with respect to the table.

The feed-out roller 260 is continuously rotated during both the down and up position but is, of course, effective only in the up position of Figures 12 and 14. The driving connections through the various chains and sprockets are sufficiently flexible to permit the roller 260 to be raised and lowered.

It will be obvious that, as pointed out in my prior application Serial No. 687,846, the angle which the belts 180 make to the side of the apparatus will not only feed the sheet longitudinally on to the table 20 but will also carry the sheet over to the left against an appropriate paper clamp or stop 350 (Figures 6, and 22 to 29) which extends along the left side of the table 20 looking at the table from the feed end.

The paper clamp 350 comprises a stop element 351 and a clamping element 352. When the clamp 350 is up in the position of Figures 27 and 29, then only the stop element 351 comes into play and the paper sheet is moved over by the belts 180 against the side stop 351.

When the paper clamp 350 is down, the clamping element 352 moves to the position of Figures 26 and 28 and clamps a sheet on the table between the clamping element 352 and the table 20, thereby holding the sheet firmly on the table.

In addition, it is necessary to provide a back stop 355 (Figures 3, 7, 26 and 27). Back stop 355 moves up and down in the slot 356 in table 20.

Back stop 355 is in the up position when the screen frame 130 is raised as is also the clamp 350 and is in the down position when the screen frame 130 is lowered.

However, the mechanism must be so adjusted that back stop 355 will not rise immediately upon the rising of the screen frame 130 since it is first necessary to cause the printed sheet to move over the back stop on to the feed-out roller.

The paper stop is mounted on the cross bar 360 which passes beneath the side frame members 18 and 19 in front of the cross bar 291. Cross bar 360 is provided at its outer end with the rods 361, 361 on each side which project upwardly through appropriate openings in the table frame pieces 18 and 19.

Compressing spring 363 between the cross bar 360 and the dependent bracket 364 biases the cross bar 360 upwardly, said compression spring being centered by the rods 361.

Thus, the cross bar 360 is biased upwardly, thereby biasing the stop member 355 upwardly to extend through the slot 356 above the level of the table. The stop member 355 is provided with the notch 370 through which the side belt 180 may pass so that the stop 355 does not interfere with the operation of the belt while it is up and so that the stop 355 may project upwardly sufficiently on both sides of the belt to serve as a back stop for the paper.

It will be seen from a comparison of Figures 26 and 27 that when the screen frame 130 is up, the springs 363 on each side urge the cross bar 360 up to raise the back stop 355 and the paper clamp 350. When the screen frame 130 is down pushing down the rods 361, then the cross bar 360 is down and the stop 350 is below the level of the table and the clamp 350 is down in clamping position.

The cross bar 360 is connected on one side by the paper clamp 350 to the front latching bar 380 which is also provided with a rod 381 extending up through the side frame member 18 and spring biased upwardly.

Thus, the front end of the clamp element 350 is also biased upwardly. Clamp 350 is so arranged that its clamping element 352 extends from adjacent the front end of the table up to a point adjacent the rear end of the table as shown in Figures 3 and 7 but does not extend clear up to the stop 355.

Thus, if the front end of the clamp element 352 is released first, it will pivot upwardly at the rear and on bar 362 being sufficiently flexible to do this, and it will thus rise sufficiently to release the clamping pressure on the paper sheet. The paper sheet will then be fed over the stop 355 on to the roller 260 by the belts 180.

At this time, the stop 355 will rise but since a portion of the paper has already passed the stop 355 and is resting on the roller 260, the paper will be fed out.

Accordingly, the screen frame 130, while it presses down the rods 361 at the rear end and the rod 381 at the front end to engage the clamp and move the stop below the level of the table 20, does not directly cause the stop or the clamp to rise when it rises. This occurs because of the latch elements 400, 401 which engage the edge of the cross bar 360 in the lowered position of the screen frame as shown in Figures 1, 7, and 27 and because of the latch element 402 which engages the front cross bar 380 for the clamp 350.

The latch elements 400 and 401 are keyed to the shaft 410 carried between the intermediate frame members 25 so that they operate simultaneously. When the cross bar 360 is pushed down by the action previously described, the edge of cross bar 360 engages the detent in latches 400 and 401.

At the same time, the edge of cross bar 380 is engaged by the detent of latch 402. This moves the stop 355 down and engages the clamping element 352 of clamp 350 against the table 20 in the position of Figures 26 and 28.

When the screen frame 130 rises, the paper stop 355 and the clamp 350 are nevertheless held down by the latches 400 and 401 at the back end of the paper stop and latch 402 at the front end for the clamp.

As the screen 130 continues to rise, the upper bifurcated end 131 of oscillating arm 114 which is beginning to move against the collar 134 strikes the adjustable stop 420 on the bell crank lever 421 which is pivoted at 422 on side frame element 25. The upper end of the bell crank lever 421 is connected by pin 424 to the link 425, which in turn is connected by pin 426 to the lower end of latch element 401.

This rotates the bell crank lever 421 clockwise with respect to Figure 1 and thus through the link 425 rotates the latch element 401 counterclockwise with respect to Figure 1 to release the back stop 355.

The raising of the screen 130 now operates the arms 220 to feed in a blank and start the belts 180; the roller 260 also rises up because it is not held by a latch.

The upper end of latch element 400 is connected at 430 to the link 431 which in turn is connected at 432 to the latch element 402 so that the latch 402 is also tripped.

The latch 402 is provided with a relatively shallow detent and is relatively shorter so that it is rotated more rapidly out of latching engagement than the latches 400 and 401.

Thus, when the latches are tripped by operation of bell crank lever 421 by oscillating arm 114, the front latch 402 releases first. This permits the front end of clamp 350 to be raised thereby clearing the clamp from its engagement with the paper on the bed of the machine.

Since the belts 180 have been energized, the paper is moved over the paper stop 355 on to the roller 260. As seen in Figure 3, this requires only a very short movement.

With the paper now on the roller 260, the continuance of rotation of the latches releases latches 400 and 401 from the paper stop bar 360 permitting the paper stop to snap up in position to furnish an appropriate stop for the next sheet of paper to be fed into the machine. The timing is thus obtained by the length of the latches and by the difference in depth of the detents.

All of the latches are spring biased toward latching position by the tension spring 440 which biases the bell crank lever 421 in a counterclockwise direction with respect to Figure 1. The top edges of all of the latches are chamfered to permit them to move to be engaged when the screen frame is lowered.

By this means, therefore, a simplified method is obtained for clamping the paper sheet and at the same time removing the paper stop from a point where it may interfere with the operation of the screen frame.

The same apparatus provides a simplified sequential means for first releasing the paper clamp to permit the paper to move the fraction of an inch necessary for it to clear the paper stop and then releasing the paper stop. Even if the paper has not yet reached the roller 260 when the paper stop 355 snaps up, the fact that the leading edge of the paper is over the paper stop and the fact that the belts 180 are operating are sufficient to ensure that the paper will be fed out.

The arrangement of the latches 400 and 402 to ensure that the front latch 402 will release first is particularly shown in Figures 23 and 25. In addition, it is necessary to obtain extreme accuracy of registry of the paper on which a stencil is to be made with the desired portion of the table.

I have found that at times the movement of the paper up to the side clamping stop element 351 while it moves up against the back stop 355 provides more accurate registry but permits no adjustment of the registry.

Accordingly, in Figures 22 to 25 and especially in Figures 28 and 29, I have shown adjusting elements which permit adjustment of the registry. This includes adjusting fingers 350, 450 keyed to the rotatable bar 451 in bearings 452, 452 on the supporting bracket 453 of the clamp.

A lever 460 is keyed to the shaft 451; a tension spring 462 is secured at its upper end to the lever 460 and is secured at its lower end to any suitable portion of the frame and thus biases lever 460 downwardly biasing the finger 450 outwardly away from the clamp 350.

The side 351 of clamp 350 is provided with slots 65 through which the ends of the fingers 450 may project as shown in Figures 28 and 29. The outer end of lever 460 rests on the adjusting screw 470 threaded into bracket 471 supported by the side frame 18.

When the screen 130 is up and hence raising the clamp 350, the spring 462 pulling down on lever 460 pulls the finger 450 out as shown in Figure 29. When the clamp 350 is lowered so that its supporting bracket 403 carries down the shaft 451, then lever 460 is rotated upwardly since screw 470 is stationary and fingers 450 are pushed in as shown in Figure 28.

The degree by which fingers 450 are pushed in on rotation of shaft 451 is controlled by the adjustment of screw 470. Thus, with the screen frame 130 up, the paper is fed in on to the table and moved against the back stop 355 and the side clamp 350. On completion of this movement and as the screen frame 130 descends, it pushes down both the back stop 355 and the side clamp 350 as above pointed out.

This action, as shown in the figures, especially Figures 28 and 29, moves the fingers 450 in the slots 465 being provided in the clamp to permit this action to occur.

The fingers 450 at each end thus push against the edge of the paper and slowly push it to the preset point of registry as determined by the adjustment of the screw 470. Thus, for sheets of paper which are required to be stencilled with slightly different margins, a simplified rapidly made adjustment is provided, the said sheets being pushed outwardly away from side stop 351 of the clamp by the degree to which the fingers 450 enter the slots 465 of the clamp.

The screen frame 130 has the general construction previously described in my prior application Serial No. 687,846 and is so arranged as to removably support a silk screen.

Thus, as seen in Figure 8, it comprises essentially the pair of longitudinal I-beams 130a and 130b connected together in any suitable manner. An inking carriage 500 comprises the outer side plates 501, 502 connected together by the cross bars 503, 504 (see Figures 1, 2, 3, 20 and 21 as well as Figure 8).

Each of the side frame members 130a and 130b of the screen frame is provided with an upper and lower rail 505, 506, respectively, to receive the rollers 508, 509, respectively, on each side of the carriage.

For rigidity, there is a pair of upper rollers 508 on each side and a pair of lower rollers 509 on each side. The inking carriage 500 may thus roll along the upper portion of the screen frame 130 from one end to the other as shown by a comparison of Figures 1 and 2.

The intermediate side plates 520 and 521 on each side are supported by the cross bars 503 and 504 which pass therethrough and are secured thereto.

The squeegee or ink spreader 530 is removably secured to the legs 531, 531 which are keyed to the shaft 532 which is journalled in appropriate bearings in the adjustable plates 540 and 541 slidably mounted inside the intermediate side plates 520 and 521. Shaft 550 is also journalled in the adjustable plates 540 and 541 but passes through the said plates and through the intermediate side plates 520 and 521, passing through the adjusting slot 560 in the intermediate side plates 520 and 521.

The adjustable plates 540 and 541 are connected, respectively, to the intermediate side plates 520 and 521 by the adjusting nut 570 on each side which engages the adjusting screw 571 on each side, which screw is in turn rigidly secured to the bracket 573 of the adjustable plates 540 and 541, respectively.

The nut 570 bears on the upper surface of bracket 580 secured to the top of the intermediate side plates 520 and 521 on each side, the screw 571 passing through an appropriate opening in the said bracket.

When it is desired to adjust the position of the squeegee 530 for various reasons, either for the purpose of raising or lowering the same or for the purpose of compensating for any cant or tilt thereof, then it is only necessary to turn the nuts 570 on each side and the adjustable plates 540 and 541 on each side will accordingly be raised and lowered. This adjustment may be locked by the locking bolt 585, the head of which bears against the material of the intermediate side plate 520 on each side of slot 560 and which is captured in the adjustable plates 540 and 541 by the nut 586.

The shaft 550 is connected by gears 590 on shaft 550 and gear 591 on shaft 532 to the shaft 532. The shaft 550 extends out on the left side of the machine with respect to Figure 8 to the tilting bar 600.

Tilting bar 600 is so arranged that it may be rotated back and forth to rotate shaft 550 back and forth and thus to rotate the shaft 532 back and forth to move the squeegee 530 back and forth. The operation of the tilting bar 600 is demonstrated in Figure 2.

When the inking carriage 500 has reached the front end of the machine by means of the apparatus hereinafter described, the printing frame 130 rises. At this time, the squeegee 530 has been in a trailing position and the tilting bar 600 was in an angular position displaced counterclockwise, which is approximately 45° from the position shown in Figure 2.

As the screen frame 130 now rises lifting up the carriage 500, the end 601 of the tilting bar strikes the pin 602 carried by the vertical bar 603 secured by an appropriate bar 604 and bracket 605 to the front side frame 18. This turns the tilting bar 600 in a clockwise direction approximately 45° to the position shown in Figure 2 and, consequently, shifts the squeegee 530 from its original trailing position to a new trailing position as shown in Figure 19, which new trailing position corresponds to the next intended movement of the inking carriage 500 back toward the delivery end of the machine.

When the delivery end of the machine is reached by the inking carriage 500, the tilting bar 600 is in the position shown in Figure 2, but the carriage 500, of course, is at the delivery end of the machine.

Now, when the printing frame 130 is again raised, the end 601 of the tilt bar 600 moves under the pin 611 carried by the vertical bar 612 supported by bracket 613 from the rear side frame 18. This will rotate the tilting bar 600 counterclockwise once more about 45° and shift the squeegee 530 to the new trailing position with respect to the next movement of the carriage toward the front or feed end of the mechanism.

Accordingly, the squeegee is shifted from one trailing position to the other as the printing frame is raised. When the squeegee reaches the end of its stroke, it is in the trailing position for that stroke but must be shifted to the trailing position for the next return stroke.

At the same time, this shift must be in such a manner as not to dislocate the ink supply. By this means, therefore, the shift of the squeegee to the proper trailing position occurs when the inking carriage 500 has been raised up by the elevation of the printing carriage.

The upper ends of the side intermediate frame members 520 and 521 are interconnected by the cross bars 620 and 621. These cross bars 620 and 621 project at 625 beyond the intermediate side plate 521.

The carriage 500 is drawn back and forth by chain 650 on each side passing over the driving sprockets 652, 652 on shaft 653 at the delivery end of the mechanism and over driving sprockets 655, 655 on shaft 656 at the feed end of the mechanism. The chain 650 is connected in any suitable manner as shown by an appropriate hitch 660 to the tilting shaft 550 on each side of the inking carriage, each of the chains 650 being continuous around their respective sprockets.

The drive for the inking carriage is obtained from motor 80 through pulley 81, belt 82, pulley 83, shaft 84, gear 88, gear 89, shaft 90, sprocket 270, chain 271, sprocket 272, shaft 273, bevel gear 665 on shaft 273 meshing with bevel gear 666 (all of the foregoing may be seen in Figure 5).

Bevel gear 666 drives the shaft 667 rotatably mounted in suitable brackets 670 on the lower frame member 11. Pulley 671 on shaft 667 drives belt 672 (Figure 1) which drives pulley 673 (Figure 15) on shaft 674. Shaft 674 is slidably mounted in appropriate bearings on the upper side frame members 11 and 10 being rotatable and slidable with respect thereto. Shaft 674 extends from the front to the back of the machine and is shown particularly in Figure 1.

Gear 680 on shaft 674 meshes with and drives the spur gear 682 secured to the rear of the stationary frame. Spur gear 682 drives gear 685 which is mounted on shaft 686 carried by the screen printing frame 130. When the screen printing frame 130 is raised from the position of Figure 1 to the position of Figure 2, the gear 685 is disengaged from the spur gear 682 and thus the driving connection to gear 685 is broken.

Side 501 of the inking carriage is provided with the longitudinally extending front and back abutment elements 690, 691. The same side of the mechanism is provided with the sleeve 695 secured across the bars 503 and 504 and surrounding the shaft 686.

Shaft 686 is a longitudinal shaft journalled in the screen frame 130 and so arranged that it may slide back and forth longitudinally as well as rotate in the bearings.

Shaft 686 is provided with a pair of clutch elements 700 at the delivery end of the machine and 701 at the feed end of the machine. Clutch element 700 has a driving element 710 keyed to shaft 686 and which may be a part of the gear 685.

Driven element 711 of clutch 700 is journalled on shaft 686 and freely rotatable with respect thereto. The driven element 711 is connected to the bevel gear 715 which is rotatably mounted in bracket 716. Bevel gear 715 meshes with bevel gear 716 of shaft 653 which carries the sprocket 652.

When the shaft 686 is moved longitudinally to the left with respect to Figure 16, then clutch element 710 is disengaged from clutch element 711, and the bevel gear 715 is no longer driven by shaft 686.

Similarly, when the shaft 686 is moved to the right with respect to Figure 16, then the clutch elements 710 and 711 of clutch 700 are engaged and bevel gear 715 is now driven by shaft 686 to drive the bevel gear 716, which in turn drives shaft 653 to drive the sprocket 652.

The opposite clutch 701 at the feed or front end of the machine comprises a clutch element 720 keyed to the shaft 686 and a clutch element 721 connected to the bevel gear 722 which is rotatably mounted in the bracket 723. Bevel gear 722 is connected with bevel gear 725 on shaft 656 which carries the sprocket 655.

When the shaft 686 is moved to the left with respect to Figure 17, then the elements of clutch 720 are engaged and bevel gear 722 drives bevel gear 725 and sprockets 655.

It will thus be seen that when the shaft 686 is moved to the left with respect to Figures 16, 17, 3, and 1, the drive for the rear or delivery end sprockets 652 is disengaged, and the drive for the front end sprockets 655 is engaged.

Similarly, when the shaft 686 is moved to the right with respect to the said figures, the drive for the rear end sprockets 652 is engaged and the drive for the front end sprockets 655 is disengaged. When sprockets 652 are engaged, the chain 650 is operated to move the inking carriage 500 from the delivery end to the feed end of the machine.

When sprockets 655 are engaged, then the inking carriage is moved from the feed end to the delivery end of the machine. Shaft 686 is provided with a collar 750 at the delivery end and 751 the feed end of the machine.

When the inking carriage 500 reaches the end of its stroke as shown in Figure 16, the sleeve 695 around shaft 686 strikes collar 750 and pushes the shaft 686 to the left, pushing the gear 685 and the clutch element 710 to the left and disengaging the clutch element 710 from clutch element 711 to disengage the bevel gear 715 from its drive.

At the same time, however, shaft 686 is pulled to the left at the opposite end (Figure 17) to cause clutch elements 720 and 721 of clutch 701 to engage to drive the bevel gear 722 and reverse the operation of the inking carriage. This will occur before the screen frame 130 can rise to lift the gear 685 out of engagement with the gear 682 and thus disconnect the drive.

In order to prevent this reverse operation from occurring before the frame rises, the abutment 691 on side plate 501 of the inking carriage 500 strikes the collar 760 on shaft 674 and pushes this shaft to the right with respect to Figure 15. This forces gear 685 to the right out of meshing engagement with gear 682 and thus disconnects the drive to gear 685 until the screen carriage 130 can begin to rise.

As the screen frame 130 rises, gear 685 is disconnected from gear 682 as shown in Figure 2 and the normal tendency of belt 682 to return the shaft 674 to its original position effects the return of shaft 674 to this original position before the screen frame 130 comes down again.

Thus, the gear 680 is kicked out to the right for a sufficient period of time to permit the drive elements for shaft 686 to be disengaged until the screen frame 130 rises and completes this disengagement. The shaft 674 returns automatically by reason of the tendency of belt 672 to straighten itself to its original position before the screen frame 130 can come down again.

When the screen frame 130 comes down once more, gear 685 re-engages gear 682, but the drive is now to the bevel gear 722 of Figure 17 and thus the drive is in a reverse direction to send the inking carriage 500 back to its initial position. It is desirable, of course, that the shaft 686 be held in the shifted position by resilient locking means until it is necessary to shift the shaft 686 back to another position.

Accordingly, I provide spring biased locking means comprising the locking bar 775 pivotally mounted at 776 on the screen frame, the outer end of the locking bar being biased in a downward direction by the tension spring 778. Locking bar 775 engages in the notch 780 at the delivery end of shaft 686. The similar locking bar 775a, similarly constructed, is arranged to engage in notch 780a at the feed end of the machine.

The arrangement shown is that wherein the drive of Figure 16 is taking place at the delivery end of the machine, but the inking carriage 500 is now almost at the end of its stroke toward the delivery end. At this time, the chamfered extension 800 of side member 501 moves under the latch 775 to lift it out of the notch 780 and thus release the shaft 686 for movement to the left when the collar 750 is struck by the sleeve 695.

At this time, the notch 780a at the feed end, as shown in Figure 17, in shaft 686 will also be pulled to the left and will snap under the latch 775a so that the shaft 636 will be locked in the new position.

By this means, therefore, it will be seen that the carriage drive is reversed at the end of each stroke to send the inking carriage back while, at the same time, the carriage drive is disconnected by two means intermediate the change-over in order to prevent reverse operation of the carriage until the screen frame 130 is lowered.

The first means comprises the abutment 691 or 690 at each end of side member 501 of the carriage which strikes the collar 760 or 760a to push the driving shaft 674 right or left out of engagement with the spur gear 682. This shifts the belt 672 laterally and the tendency of the belt to restore itself to a straight position with respect to its pulleys restores the shaft 674 to its original driving position.

By this time, however, the gear 685 has been disconnected from gear 682 by reason of the rise of the screen frame while the shaft 686 has been shifted to reverse the operation of the sprockets, as above pointed out, the driving sprockets being shifted from one set to the other as this reversal occurs. Spur gear 682 is sufficiently wide to accommodate itself to this shift.

In the operation of my novel device, I also provide simplified foot actuated means for halting the inking carriage 500 at any portion of its stroke. The foot actuated means comprises a lever 900 pivoted at 901 on the side of the auxiliary frame 30 and having a bifurcated extension 902 engaging the shaft 674 and so arranged that when the lever 900 is rotated counterclockwise with respect to Figure 1 around its pivot 901, it will strike the collar 674a on shaft 674 to draw the shaft 674 to the left and disengage the driving connection between gear 680 and the spur gear 682, thereby halting the drive to the inking carriage 500 and stopping the operation of the carriage. This is accomplished by providing a foot pedal 910 pivotally secured at 911 to any appropriate base piece and pivotally connected at its opposite end to link 912, which in turn is connected to the lower end of the bent lever 900.

Pressing down the foot pedal 910 will result in the above-mentioned counterclockwise rotation of the level 900 to effect the disengagement of gears 680 and 682 as shown in Figure 1 and thus halt the operation of the machine. Appropriate means including a spring or other biasing means may be provided to return the lever 900 and the foot pedal 910 to their original positions.

In the foregoing, I have described my invention solely in connection with preferred illustrative embodiments thereof. Since many variations and modifications of my invention will now be obvious to those skilled in the art, I prefer to be bound not by the specific disclosures herein contained but only by the appended claims.

I claim:

1. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said feed belts being operative to move work on said work supporting surface when the stencil frame is raised and being inoperative to move said work when the frame is lowered; said stop member extending normal to the direction of movement of the work and being raised on said surface when the stencil frame is raised and being removed from stopping relation with said surface when the stencil frame is lowered and a side guide; said side guide coacting with the belts and the stop member to control the position of the work on the work supporting surface; said side guide extending parallel to the direction of movement of the work and normal to the stop member, said side guide being raised when said stencil frame is raised and lowered when said stencil frame is lowered; said side guide having a clamping surface for pressing the work against said work supporting surface and holding the work stationary when said side guide is lowered and finger members operable through said side guide as the side guide is lowered to move the material to be clamped to accurate registry.

2. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said feed belts being operative to move work on said work supporting surface when the stencil frame is raised and being inoperative to move said work when the frame is lowered; said stop member extending normal to the direction of movement of the work and being raised on said surface when the stencil frame is raised and being removed from stopping relation with said surface when the stencil frame is lowered and a side guide; said side guide coacting with the belt and the stop member to control the position of the work on the work supporting surface; said side guide extending parallel to the direction of movement of the work and normal to the stop member, said side guide being raised when said stencil frame is raised and lowered when said stencil frame is lowered; said side guide having a clamping surface for pressing the work against said work supporting surface and holding the work stationary when said side guide is lowered and finger members operable through said side guide as the side guide is lowered to move the material to be clamped to accurate registry; said finger members being mounted on said side guide, an extension from said finger members engageable with a stationary element of the machine to move said finger members to registering position as the side guide is lowered.

3. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said feed belts being operative to move work on said work supporting surface when the stencil frame is raised and being inoperative to move said work when the frame is lowered; said stop member extending normal to the direction of movement of the work and being raised on said surface when the stencil frame is raised and being removed from stopping relation with said surface when the stencil frame is lowered and a side guide; said side guide coacting with the belts and the stop member to control the position of the work on the work supporting surface; said side guide extending parallel to the direction of movement of the work and normal to the stop member, said side guide being raised when said stencil frame is raised and lowered when said stencil frame is lowered; said side guide having a clamping surface for pressing the work against said work supporting surface and holding the work stationary when said side guide is lowered and finger members operable through said side guide as the side guide is lowered to move the material to be clamped to accurate registry; said finger members being mounted on said side guide, an extension from said finger members engageable with a stationary element of the machine to move said finger members to registering position as the side guide is lowered; said stationary element being adjustable to adjust the movement of said fingers.

4. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said side guide extending parallel to the direction of movement of the work and normal to the stop member, said side guide being raised when said stencil frame is raised and lowered when said stencil frame is lowered; said side guide having a clamping surface for pressing the work against said work supporting surface and holding the work stationary when said side guide is lowered and finger members operable through said side guide as the side guide is lowered to move the material to be clamped to accurate registry.

5. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said side guide extending parallel to the direction of movement of the work and normal to the stop member, said side guide being raised when said stencil frame is raised and lowered when said stencil frame is lowered; said side guide having a clamping surface for pressing the work against said work supporting surface and holding the work stationary when said side guide is lowered and finger members operable through said side guide as the side guide is lowered to move the material to be clamped to accurate registry; said finger members being mounted on said side guide, an extension from said finger members engageable with a stationary element of the machine to move said finger members to registering position as the side guide is lowered; said stationary element being adjustable to adjust the movement of said fingers.

6. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said feed belts being operative to move work on said work supporting surface when the stencil frame is raised and being inoperative to move said work when the frame is lowered; said stop member extending normal to the direction of movement of the work and being raised on said surface when the stencil frame is raised and being removed from stopping relation with said surface when the stencil frame is lowered and a side guide; said side guide coacting with the belts and the stop member to control the position of the work on the work supporting surface; said side guide extending parallel to the direction of movement of the work and normal to the stop member, said side guide being raised when said stencil frame is raised and lowered when said stencil frame is lowered; said side guide having a clamping surface for pressing the work against said work supporting surface and holding the work stationary when said side guide is lowered and finger members operable through said side guide as the side guide is lowered to move the material to be clamped to accurate registry; said stop member being held in non-stopping position when the stencil frame is first raised and the feed belts begin to operate to permit the stencilled work on the work supporting surface to clear the stop; said stop member moving to stopping position when the leading edge of the stencilled work clears the stop; said side guide and clamp rising before said stop member.

7. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts operating over said work supporting surface, grooves in said work supporting surface receiving said belts, and a roller at one end of said work supporting surface; means for raising said roller when the screen frame is raised to lift said belts above said work supporting surface; said means lowering said roller when said screen frame is lowered to move said belts into said grooves.

8. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said feed belts being operative to move work on said work supporting surface when the stencil frame is raised and being inoperative to move said work when the frame is lowered; a feed roller and an oscillatable mounting therefor; a connection between the screen frame and the oscillatable mounting to move said feed roller into engagement with said belts when said frame is raised and out of engagement with said belts when the frame is lowered.

9. A stencil printing machine including a work supporting surface, a stencil carrying frame movable toward and away from said work supporting surface, an inking carriage carried by said stencil frame and movable along said stencil frame and means responsive to the movement of the stencil frame toward and away from the work supporting surface to control the feeding and positioning of work on said surface; said means comprising a plurality of feed belts and a stop member; said feed belts being operative to move work on said work supporting surface when the stencil frame is raised and being inoperative to move said work when the frame is lowered; a feed roller and an oscillatable mounting therefor; a connection between the screen frame and the oscillatable mounting to move said feed roller into engagement with said belts when said frame is raised and out of engagement with said belts when the frame is lowered; an engageable and disengageable driving connection to said belts, means controlled by the movement of the feed roller to the belts to engage the driving connection for the belts and by the movement of the feed roller away from the belts to disengage the driving connection therefor.

10. A stencil printing machine including a work supporting surface, a stencil carrying frame movable toward and away from said work supporting surface, an inking carriage carried by said stencil frame and movable along said stencil frame, said carriage being movable along said stencil frame in one direction when the stencil frame is lowered to bring its stencil into engagement with work on the work supporting surface; said carriage being halted when the stencil frame is raised and being movable in the opposite direction when the stencil frame is lowered again; said inking carriage carrying a squeegee extending transversely of the stencil frame and normal to the direction of movement of the stencil; said squeegee being rotatably mounted in said carriage on an axis parallel thereto and transverse of the stencil frame, and means controlled by the raising of the stencil frame to rotate the squeegee from trailing position at the end of a stroke to the trailing position for the return stroke to be made when the stencil frame is again lowered.

11. A stencil printing machine including a work supporting surface, a stencil carrying frame movable toward and away from said work supporting surface, an inking carriage carried by said stencil frame and movable along said stencil frame, said carriage being movable along said stencil frame in one direction when the stencil frame is lowered to bring its stencil into engagement with work on the work supporting surface; said carriage being halted when the stencil frame is raised and being movable in the opposite direction when the stencil frame is lowered again; said inking carriage carrying a squeegee extending transversely of the stencil frame and normal to the direction of movement of the stencil; said squeegee being rotatably mounted in said carriage on an axis parallel thereto and transverse of the stencil frame, and means controlled by the raising of the stencil frame to rotate the squeegee from trailing position at the end of a stroke to the trailing position for the return stroke to be made when the stencil frame is again lowered; said means comprising a tilt bar connected to the rotatable mounting of the squeegee; and a stationary member at each end of the machine engaged by said tilt bar when the stencil frame is raised to rotate said tilt bar and squeegee to the new trailing position.

GEORGE H. PEMBROKE.

REFERENCES CITED

The following references are of record in the file of this patent:

UNITED STATES PATENTS

| Number | Name | Date |
|---|---|---|
| 155,879 | McDonald | Oct. 13, 1874 |
| 161,158 | Rosenthal | Mar. 23, 1875 |
| 1,589,546 | Nichols | June 22, 1926 |
| 1,832,828 | Borregard | Nov. 17, 1931 |
| 1,843,116 | Aldcroftt et al. | Feb. 2, 1932 |
| 1,922,341 | Aldcroftt | Aug. 15, 1933 |
| 2,210,474 | Tillett | Aug. 6, 1940 |